US009802645B2

(12) United States Patent
Kudo

(10) Patent No.: US 9,802,645 B2
(45) Date of Patent: Oct. 31, 2017

(54) STEERING REACTION FORCE CONTROL APPARATUS FOR VEHICLE

(71) Applicant: TOYOTA JIDOSHA KABUSHIKI KAISHA, Toyota-shi, Aichi-ken (JP)

(72) Inventor: Yoshio Kudo, Machida (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/249,633

(22) Filed: Aug. 29, 2016

(65) Prior Publication Data

US 2017/0066476 A1    Mar. 9, 2017

(30) Foreign Application Priority Data

Sep. 8, 2015  (JP) .................................. 2015-176844

(51) Int. Cl.
*B62D 6/00* (2006.01)
*B62D 5/04* (2006.01)
*B62D 15/02* (2006.01)

(52) U.S. Cl.
CPC ........... *B62D 6/008* (2013.01); *B62D 5/0463* (2013.01); *B62D 15/025* (2013.01)

(58) Field of Classification Search
CPC . B62D 6/008; B62D 6/02; B62D 6/10; B62D 6/002; B62D 5/005; B62D 5/006; B62D 5/0457

See application file for complete search history.

(56) References Cited

U.S. PATENT DOCUMENTS

| 2008/0142293 | A1* | 6/2008 | Goto | ...................... | B62D 6/008 180/446 |
| 2010/0318264 | A1* | 12/2010 | Maeda | ................... | B62D 5/001 701/42 |
| 2011/0257845 | A1* | 10/2011 | Niki | ....................... | B62D 5/046 701/41 |
| 2013/0179039 | A1* | 7/2013 | Uryu | .................... | B62D 5/0463 701/42 |
| 2013/0190988 | A1* | 7/2013 | Limpibunterng | ...... | B62D 5/008 701/42 |

(Continued)

FOREIGN PATENT DOCUMENTS

JP         2002-120743 A     4/2002
JP         2006-290127 A    10/2006

(Continued)

*Primary Examiner* — Redhwan k Mawari
*Assistant Examiner* — Michael Whalen
(74) *Attorney, Agent, or Firm* — Sughrue Mion, PLLC

(57) ABSTRACT

Provided is a steering reaction force control apparatus for a vehicle including a driving support device configured to control an electric power steering device via a controller so that a steered angle of steered wheels reaches a target steered angle. When the driving support device is operating, the controller calculates a target steering spring torque based on a corrected steering angle corrected by a target steering angle for driving support control. When the magnitude of the corrected steering angle is less than a reference value, the target steering spring torque is calculated so that the magnitude of the target steering spring torque becomes larger in a case where the driving support device is operating compared with a case where the driving support device is not operating.

2 Claims, 6 Drawing Sheets

(56) References Cited

U.S. PATENT DOCUMENTS

| | | | | |
|---|---|---|---|---|
| 2014/0229068 A1* | 8/2014 | Ueyama | ............... | B62D 15/025 |
| | | | | 701/41 |
| 2015/0088383 A1* | 3/2015 | Kodato | ................. | B62D 6/007 |
| | | | | 701/41 |
| 2015/0291208 A1* | 10/2015 | Miyasaka | .............. | B62D 5/003 |
| | | | | 701/41 |

FOREIGN PATENT DOCUMENTS

| JP | 2007-076582 A | 3/2007 |
|---|---|---|
| JP | 2013-193490 A | 9/2013 |

* cited by examiner

STEERING REACTION FORCE CONTROL APPARATUS FOR VEHICLE

BACKGROUND

1. Technical Field

The present disclosure relates to a steering reaction force control apparatus for a vehicle including an electric power steering device and a driving support device.

2. Description of the Related Art

A steering reaction force control apparatus for a vehicle, e.g., a motor vehicle, is configured to apply a torque to a steering device through an electric power steering device, thereby reducing a steering load imposed on a driver, and improving steering feeling. For example, as described in Japanese Patent Application Laid-open No. 2007-76582, in a steering reaction force control apparatus, a target steering reaction force torque is calculated, and an electric power steering device is controlled through PID feedback so that an actual steering reaction torque reaches the target steering reaction force torque. The target steering reaction force torque includes a target spring torque for generating a force of returning a steering wheel to a neutral position, and further includes a target attenuation torque for generating a steering resistance force proportional to a steering angular velocity to increase stability of a steering system.

Incidentally, as disclosed in Japanese Patent Application Laid-open No. 2013-193490, in a vehicle including a driving support device configured to carry out automatic driving or the like, a control device for an electric power steering device is configured to operate in two operation modes including a manual steering mode and an automatic steering mode, and the operation mode is chosen by a passenger of the vehicle operating a switch.

In any one of the manual steering mode and the automatic steering mode, the control device for the steering reaction force control apparatus is configured to calculate a target steering reaction force torque, and control the electric power steering device through the PID feedback so that an actual steering reaction torque reaches the target steering reaction force torque.

In the automatic steering mode, the electric power steering device also functions as an actuator configured to generate a steering torque for automatically steering the steered wheels. The driving support device is configured to calculate a target steered angle of the steered wheels for causing the vehicle, for example, to travel along a traveling lane, and the control device is configured to calculate a target steering reaction force torque based on a deviation between the target steered angle and an actual steered angle of the steered wheels. Further, the control device is configured to control the electric power steering device through the PID feedback so that the steering reaction torque reaches the target steering reaction force torque, and as a result, the steering reaction force is controlled, and the steered angle of the steered wheels is also controlled so as to reach the target steered angle.

Specifically, the target steering spring torque is calculated based on the steering angle corrected by the target steering angle corresponding to the target steered angle, and the target steering attenuation torque is calculated based on a time derivative of the steering angle or a time derivative of the corrected steering angle. As a ratio of the target steering spring torque to the steering angle or the corrected steering angle increases, the steering reaction force felt by the driver increases, and the steering assist torque thus consequently decreases.

In general, a gain when the electric power steering device is controlled through the PID feedback is constant in the steering reaction force control apparatus. Therefore, when the gain of the feedback control is set to a high value by making a steering spring torque be large in magnitude in order to improve a property of the steered wheels to follow the target steered angle in the automatic steering mode, the steering reaction force felt by the driver increases when he or she steers in a direction where an actual steered angle of the steered wheels is changed away from the target steered angle, and an operability of override steering, namely, an operability by which the driver performs steering while overriding the automatic steering deteriorates. Conversely, when the gain of the feedback control is set to a low value by making a steering spring torque be small in magnitude in order to secure the operability of the override steering, the property of the steered wheels to follow the target steered angle in the automatic steering mode deteriorates.

SUMMARY

It is a primary object of exemplary aspects of the present disclosure to improve, in control for a steering reaction force in a vehicle including a driving support device, a property of steered wheels to follow a target steered angle without a decrease in an operability of override steering in an automatic steering mode.

According to one embodiment of the present disclosure, there is provided a steering reaction force control apparatus for a vehicle, which is to be applied to a vehicle having an electric power steering device and a driving support device configured to control the electric power steering device so that a steered angle of steered wheels reaches a target steered angle, the steering reaction force control apparatus comprising a controller configured to control the electric power steering device and the driving support device; the controller being configured to acquire a steering indication value representing an actual steering operation amount of a driver; to calculate a target steering reaction force including a target steering spring force that is based on the steering indication value; and to control the electric power steering device so that a steering reaction force reaches the target steering reaction force; and the controller being configured to calculate the target steering spring force based on the steering indication value when the driving support device is not operating and to calculate the target steering spring force based on a corrected steering indication value acquired by correcting the steering indication value with a target steering indication value corresponding to the target steered angle when the driving support device is operating.

Further, the controller is configured to calculate, when a magnitude of the steering indication value for calculating the target steering spring force is less than a reference value, the target steering spring force so that a magnitude of the target steering spring force becomes larger when the driving support device is operating compared with when the driving support device is not operating.

In general, a change range of the steered angle of the steered wheels in the driving support control, e.g., the automatic driving, is less than a change range of the steered angle of the steered wheels by the normal steering operation of the driver. Thus, the magnitude of a difference between the target steered angle of the steered wheels and the actual steered angle does not become a large value, and thus, the magnitude of the steering indication value for calculating the target steering spring torque, namely, the steering indication value corrected with the target steering indication value corresponding to the target steered angle, also does not become a large value.

With the above-mentioned configuration, when the magnitude of the steering indication value for calculating the target steering spring force is less than the reference value, the target steering spring force is calculated so that the magnitude of the target steering spring force becomes larger in the case in which the driving support device is operating compared with the case in which the driving support device is not operating. The steering spring force that is based on the target steering spring force when the driving support device is operating acts as a force of causing the actual steered angle of the steered wheels to approach the target steered angle. Thus, the property of the steered wheels to follow the target steered angle when the driving support device is operating can be improved.

When the magnitude of the steering indication value for calculating the target steering spring force is equal to or more than the reference value, the target steering spring force does not need to be calculated so that the magnitude of the target steering spring force becomes larger in the case in which the driving support device is operating compared with the case in which the driving support device is not operating. Thus, the force for causing the steered angle of the steered wheels to approach the target steered angle does not become large, and thus, the operability of the override steering in the automatic steering mode does not deteriorate.

The "steering indication value representing the actual steering operation amount of the driver" is a value representing an actual steering operation amount of the driver, and may be an arbitrary value that can be detected or estimated. For example, the steering indication value may be one of a steering angle, which is a rotational angle of a steering shaft, a rotational angle of a motor of the electric power steering device, a steered angle of the steered wheels, a yaw rate of the vehicle, a lateral acceleration of the vehicle, and a rotational angle of a pinion shaft or a stroke of a rack bar when the steering device is a rack-and-pinion device. Further, the "target steering indication value" is a target value of the steering indication value, and is a target steering angle when, for example, the steering indication value is the steering angle.

In one aspect of the present disclosure, the controller is configured to, when the magnitude of the steering indication value for calculating the target steering spring force is more than the reference value, calculate the target steering spring force so that the target steering spring force becomes smaller when which the driving support device is operating compared with when the driving support device is not operating.

As described above, the steering spring force that is based on the target steering spring force when the driving support device is operating acts as the force of causing the actual steered angle of the steered wheels to approach the target steered angle. Thus, when the driver carries out a steering operation for the override steering toward such a direction that the actual steered angle of the steered wheels departs from the target steered angle, the steering spring force that is based on the target steering spring force interferes with the steering operation of the driver. Moreover, as described above, the change range of the steered angle of the steered wheels in the driving support control, e.g., the automatic driving, is less than the change range of the steered angle of the steered wheels by the normal steering operation of the driver. Thus, when the magnitude of the steering indication value for calculating the target steering spring force is more than the reference value, the action of causing the actual steered angle of the steered wheels to approach the target steered angle may be low.

With the above-mentioned configuration, when the magnitude of the steering indication value for calculating the target steering spring force is more than the reference value, the target steering spring force is calculated so that the magnitude of the target steering spring force becomes larger in the case in which the driving support device is operating compared with the case in which the driving support device is not operating. Thus, the action of causing the actual steered angle of the steered wheels to approach the target steered angle is reduced. Thus, when the driver carries out the override steering at an operation amount that is large in magnitude toward the direction of causing the actual steered angle of the steered wheels to depart from the target steered angle, such a fear that the steering spring force that is based on the target steering spring force interferes with the steering operation of the driver can be reduced, thereby improving a steering property of the override steering.

In one aspect of the present disclosure, a difference between the target steering spring force when the driving support device is operating and the target steering spring force when the driving support device is not operating is 0 when the magnitude of the steering indication value for calculating the target steering spring force is the reference value, and gradually increases as a magnitude of a difference between the magnitude of the steering indication value for calculating the target steering spring force and the reference value increases in a range equal to or less than a predetermined value.

In the above-mentioned aspect, the difference in the target steering spring force gradually increases from 0 as the magnitude of the difference between the magnitude of the steering indication value for calculating the target steering spring force and the reference value increases from the reference value in the range equal to or less than the predetermined value. Thus, when the magnitude of the steering indication value for calculating the target steering spring force increases/decreases beyond the reference value, the magnitude of the target steering spring force can be prevented from drastically changing.

DETAILED DESCRIPTION OF THE PREFERRED EMBODIMENTS

Now, referring to the accompanying drawings, preferred embodiments of the present disclosure are described in detail.

Figure 1:
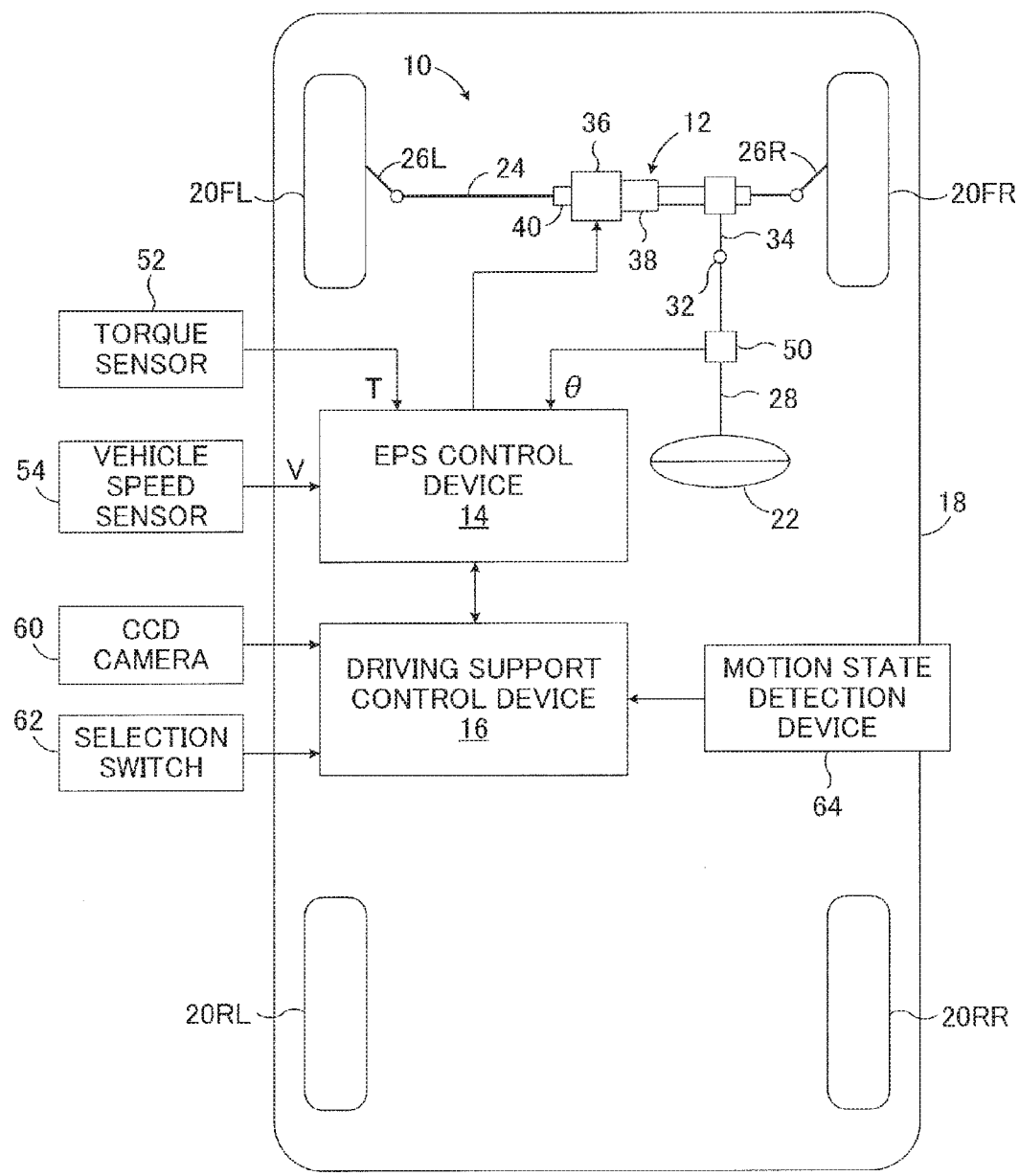
FIG. 1 is a schematic configuration diagram for illustrating a steering reaction force control apparatus for a vehicle according to an embodiment of the present disclosure.

FIG. 1 is a schematic configuration diagram for illustrating a steering reaction force control apparatus 10 according to an embodiment of the present disclosure. The steering reaction force control apparatus 10 is applied to a vehicle 18 including an electric power steering (EPS) device 12, an EPS control device 14 serving as a control device configured to control the electric power steering device 12, and a driving support control device 16.

As illustrated in FIG. 1, the vehicle 18 includes front left and right wheels 20FL and 20FR, which are steered wheels, and rear left and right wheels 20RL and 20RR, which are non-steered wheels. The front wheels 20FL and 20FR are steered via a rack bar 24 and tie rods 26L and 26R by the electric power steering device 12 driven in response to an operation by a driver on a steering wheel 22. The steering wheel 22 is connected to a pinion shaft 34 of the electric power steering device 12 via a steering shaft 28 and a universal joint 32.

In the embodiment, the electric power steering device 12 is a rack coaxial type electric power steering device, and includes a motor 36, and a conversion mechanism 38, e.g., a ball screw mechanism, configured to convert a rotational torque of the motor 36 into a force in a reciprocal direction of the rack bar 24. The electric power steering device 12 is configured to generate a force for driving the rack bar 24 relatively to a housing 40, to thereby alleviate a steering load on the driver, and to generate a drive torque for automatically steering the front wheels 20FL and 20FR. A detailed description is later given of control of the electric power steering device 12 by the EPS control device 14.

As can be understood from the description given above, the steering shaft 28, the universal joint 32, the electric power steering device 12, the rack bar 24, the tie rods 26L and 26R, and the like form a steering apparatus. The electric power steering device 12 is configured to apply a torque to the steering apparatus by applying a driving force to the rack bar 24, but may instead be configured to apply a torque to the steering shaft 28.

In the embodiment, a steering angle sensor 50 configured to detect a rotational angle of the steering shaft 28 as a steering angle θ is arranged on the steering shaft 28. A steering torque sensor 52 configured to detect a steering torque T is arranged on the pinion shaft 34. The steering torque sensor 52 may be arranged on the steering shaft 28. A signal indicating the steering angle θ and a signal indicating the steering torque T are input to the EPS control device 14. A vehicle speed sensor 54 configured to detect a vehicle speed V is arranged on the vehicle 18, and a signal indicating the vehicle speed V is also input to the EPS control device 14.

Further, on the vehicle 18, a CCD camera 60 configured to photograph a front field of view of the vehicle, and a selection switch 62 configured to select whether or not to carry out trajectory control (also referred to as "lane keeping assist (LKA) control") of allowing the vehicle to travel along a lane are arranged. The selection switch 62 is configured to be operated by an occupant of the vehicle, and to switch between an operation position (on) for operating the driving support control device 16 to carry out the trajectory control as driving support control and a non-operation position (off) for not operating the driving support control device 16. A signal indicating image information on the front field of view of the vehicle that is photographed with the CCD camera 60 and a signal indicating the position (on or off) of the selection switch 62 are input to the driving support control device 16.

Signals indicating motion state amounts of the vehicle required for the driving support control for the vehicle 18, such as a yaw rate, a longitudinal acceleration, and a lateral acceleration of the vehicle 18, are also input to the driving support control device 16 from a motion state detection device 64. In this case, the image information on the front field of view of the vehicle and information on a traveling lane may be acquired by means other than the CCD camera 60, or may be acquired by a combination of the CCD camera 60 and other means.

Each of the EPS control device 14 and the driving support control device 16 includes a microcomputer including a CPU, a ROM, a RAM, and an input/output port device mutually connected to one another via a bidirectional common bus. The EPS control device 14 and the driving support control device 16 mutually transmit and receive information through communication as necessary. The steering angle sensor 50 and the steering torque sensor 52 respectively detect the steering angle θ and the steering torque T with the steering for a left turn direction of the vehicle being considered as positive.

Figure 2:
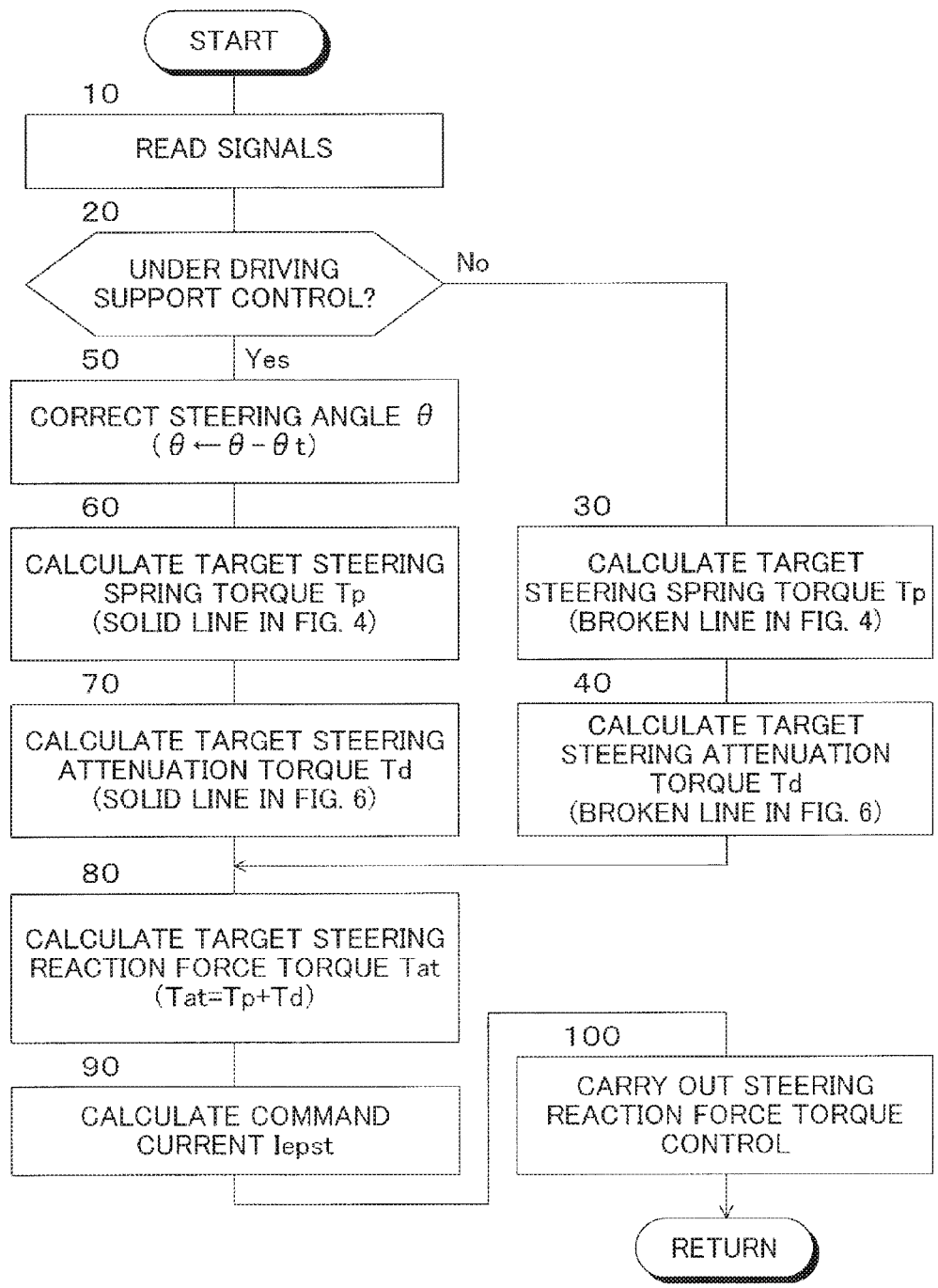
FIG. 2 is a flowchart for illustrating a steering reaction force torque control routine of the embodiment.
Figure 3:
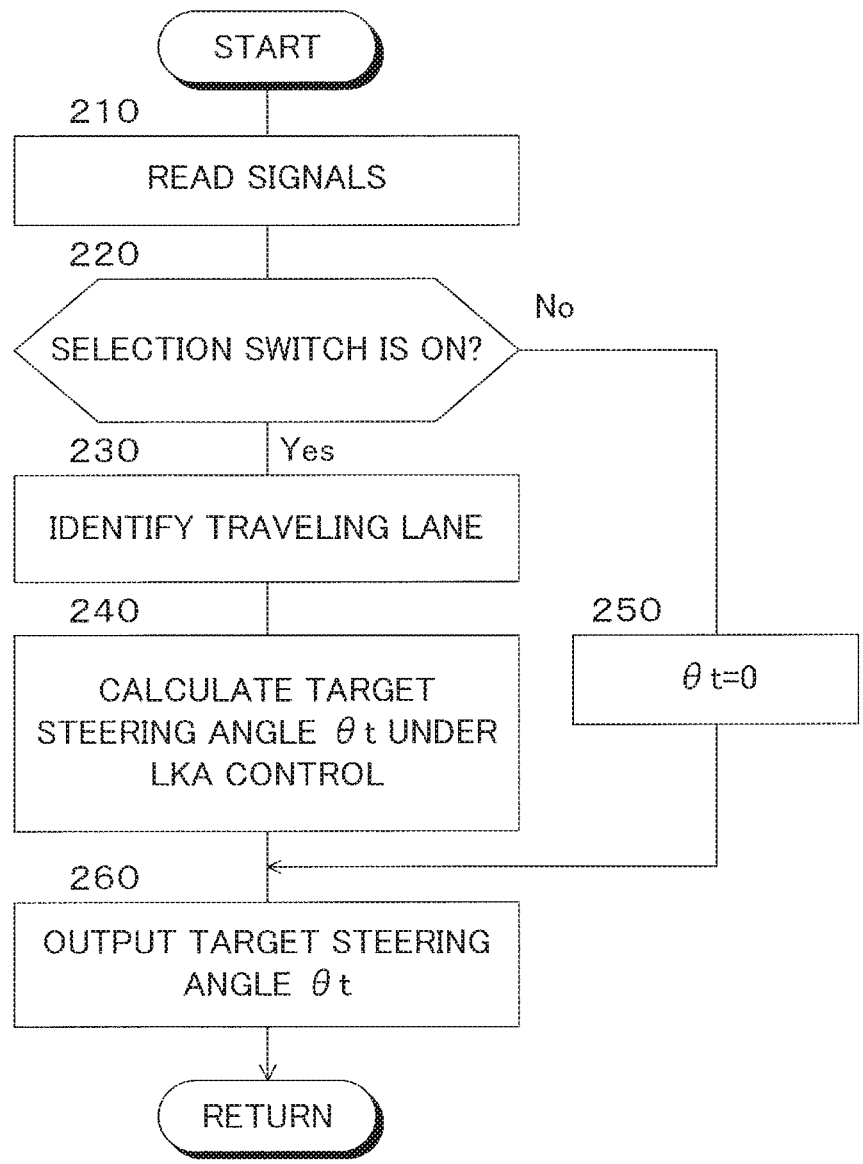
FIG. 3 is a flowchart for illustrating a driving support control routine of the embodiment.

As described later in detail, the EPS control device 14 is configured to control the electric power steering device 12 in accordance with a flowchart illustrated in FIG. 2, to thereby carry out steering reaction force torque control. The driving support control device 16 is configured to carry out driving support control in accordance with a flowchart illustrated in FIG. 3. As illustrated in FIG. 2 and FIG. 3, a "steering indication value representing an actual steering operation amount of a driver" and a "target steering indication value" are respectively the steering angle θ and a target steering angle θt.

LKA control serving as the driving support control may be any one of control of causing the vehicle to travel along a target trajectory after the target trajectory is set and control of preventing the vehicle from departing from a traveling lane. Further, LKA control serving as the driving support control is carried out when the selection switch 62 is on, but automatic steering (emergency avoidance steering) for avoiding an emergency, for example, the vehicle 18 traveling to circumvent an obstacle in front of the vehicle, may be carried out as the driving support control even when the selection switch 62 is off.

<Steering Reaction Force Torque Control>

Next, a description is given of a routine of controlling a steering reaction force torque in the embodiment with reference to the flowchart illustrated in FIG. 2. The control executed in accordance with the flowchart illustrated in FIG. 2 is carried out at specific time interval by the EPS control device 14 during an ignition switch not illustrated in FIG. 1 is on.

First, in Step 10, a signal indicating the steering angle $\theta$ detected by the steering angle sensor 50 and the like are read.

In Step 20, it is determined whether or not driving support control is being carried out by the driving support control device 16 through determination of, for example, whether or not the selection switch 62 is on. When an affirmative determination is made, the steering reaction force torque control proceeds to Step 50, whereas when a negative determination is made, the steering reaction force torque control proceeds to Step 30.

Figure 4:
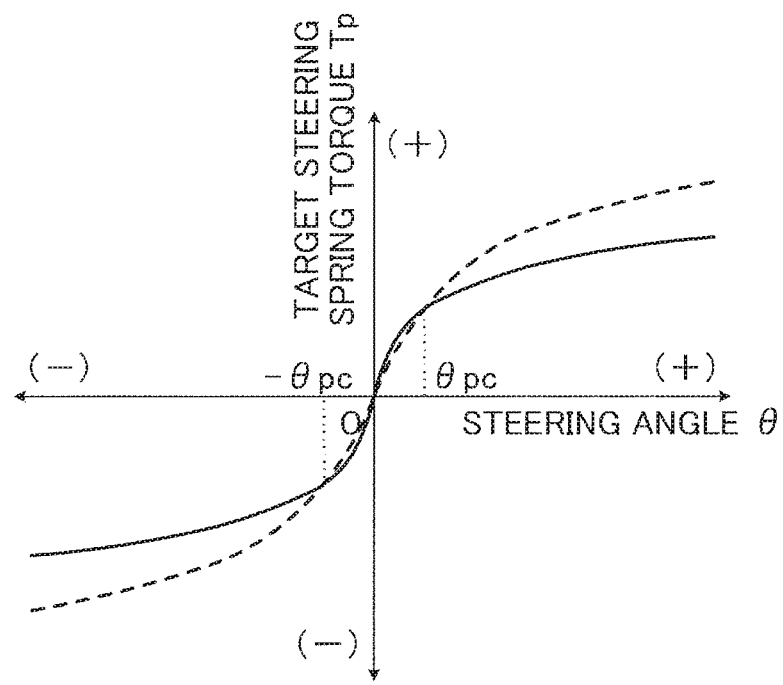
FIG. 4 is a map for showing a relationship between a steering angle $\theta$ and a target steering spring torque Tp of the embodiment.

In Step 30, a target steering spring torque Tp corresponding to the target steering spring force is calculated by referring to a map represented by the broken line of FIG. 4 based on the steering angle $\theta$. As shown in FIG. 4, the magnitude of the target steering spring torque Tp increases as the magnitude of the steering angle $\theta$ increases, but a ratio of an increase amount of the magnitude of the target steering spring torque Tp to an increase amount of the magnitude of the steering angle $\theta$ decreases as the magnitude of the steering angle $\theta$ increases. The relationship between the steering angle $\theta$ and the target steering spring torque Tp shown in FIG. 4 is an example of the relationship.

Figure 6:
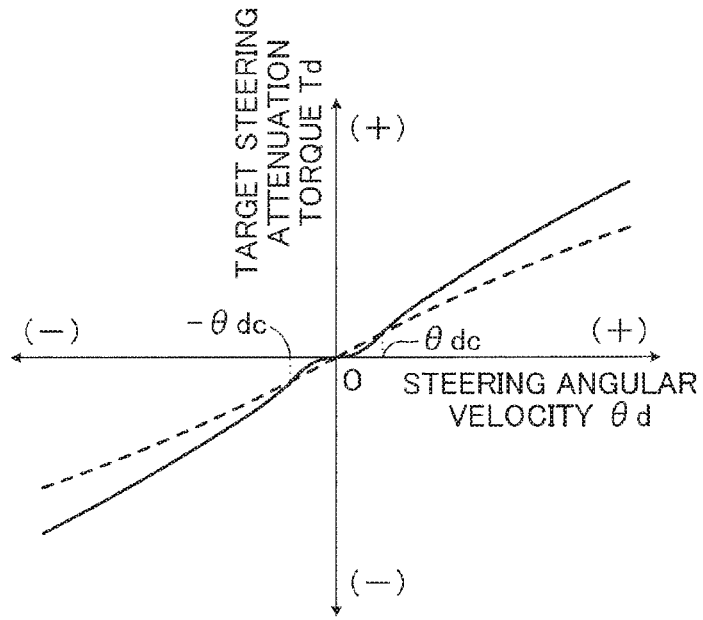
FIG. 6 is a map for showing a relationship between a steering angular velocity $\theta d$ and a target steering attenuation torque Td of the embodiment.

In Step 40, a time derivative of the steering angle $\theta$ is calculated as a steering angular velocity $\theta d$, and a map represented by the broken line of FIG. 6 is referred to based on the steering angular velocity $\theta d$, thereby calculating a target steering attenuation torque Td corresponding to a target steering attenuation force. As shown in FIG. 6, the magnitude of the target steering attenuation torque Td increases as the magnitude of the steering angular velocity $\theta d$ increases. A ratio of the target steering attenuation torque Td to the steering angular velocity $\theta d$ is substantially constant regardless of the magnitude of the steering angular velocity $\theta d$. The relationship between the steering angular velocity $\theta d$ and the target steering attenuation torque Td shown in FIG. 6 is an example of the relationship.

In Step 50, the corrected steering angle $\theta$ is calculated by subtracting the target steering angle $\theta t$ calculated by the driving support device 16 described later from the steering angle $\theta$.

Figure 5:
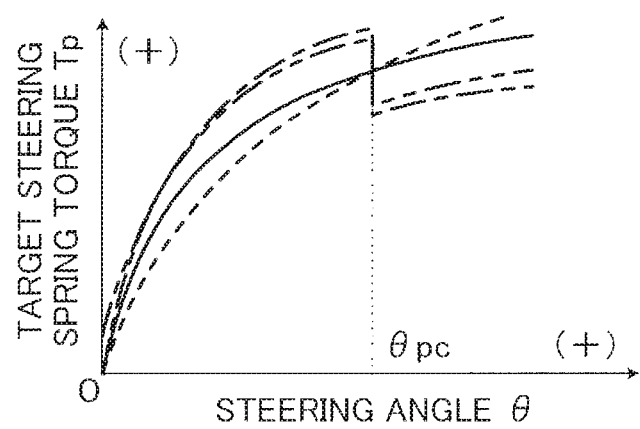
FIG. 5 is a graph for showing the relationship shown in FIG. 4 in an enlarged form in a range in which the steering angle $\theta$ is positive and small along with a first comparative example (long dashed short dashed line) and a second comparative example (long dashed double-short dashed line).

In Step 60, the target steering spring torque Tp corresponding to the target steering spring force is calculated by referring to a map represented by the solid line of FIG. 4 based on the corrected steering angle $\theta$. As shown in FIG. 4 and FIG. 5, when the magnitude of the steering angle $\theta$ is less than a reference value $\theta pc$ (positive constant), the magnitude of the target steering spring torque Tp when the driving support control is being carried out is more than the magnitude of the target steering spring torque Tp when the driving support control is not being carried out. Conversely, when the magnitude of the steering angle $\theta$ is more than the reference value $\theta pc$, the magnitude of the target steering spring torque Tp when the driving support control is being carried out is less than the magnitude of the target steering spring torque Tp when the driving support control is not being carried out.

Further, when the magnitude of the steering angle $\theta$ is the reference value $\theta pc$, the magnitude of the target steering spring torque Tp when the driving support control is being carried out is the same as the magnitude of the target steering spring torque Tp when the driving support control is not being carried out. Thus, a difference $\Delta Tp$ in the target steering spring torque, which is a value acquired by subtracting the latter target steering spring torque Tp from the former target steering spring torque Tp, is 0. $\Delta \theta pc$ is set to a positive constant of ½ to ⅓ of $\theta pc$. A range of the steering angle between $\theta pc - \Delta \theta pc$ and $\theta pc + \Delta \theta pc$ is set to a predetermined range of the steering angle. When the magnitude of the steering angle $\theta$ is a value in the predetermined range of the steering angle, the magnitude of the difference $\Delta Tp$ in the target steering spring torque gradually increases as the difference between the magnitude of the steering angle $\theta$ used in calculating the target steering spring torque Tp and the reference value $\theta pc$ increases.

Figure 8:
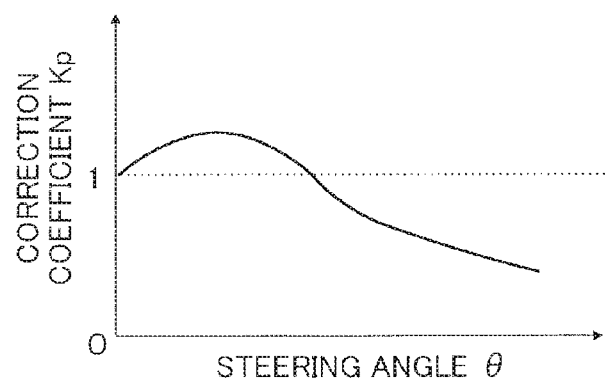
FIG. 8 is a graph for showing a relationship between the steering angle θ and a correction coefficient Kp according to a first modified example of the present disclosure.

The target steering spring torque Tp when the driving support control is being carried out may be calculated in the following manner (first modified example). First, the target steering spring torque Tp is temporarily calculated by referring to the map represented by the broken line of FIG. 4 based on the corrected steering angle $\theta$. Then, a correction coefficient Kp is calculated by referring to a map shown in FIG. 8 based on the corrected steering angle $\theta$. Further, the target steering spring torque Tp when the driving support control is being carried out is calculated as a product of the target steering spring torque Tp temporarily calculated and the correction coefficient Kp.

Figure 7:
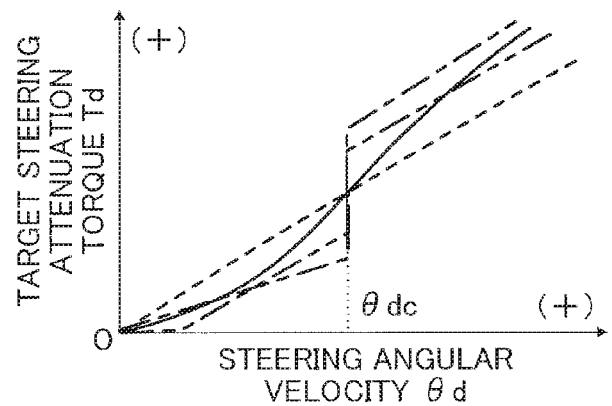
FIG. 7 is a graph for showing the relationship shown in FIG. 6 in an enlarged form in a range in which the steering angular velocity $\theta d$ is positive and small along with the first comparative example (long dashed short dashed line) and the second comparative example (long dashed double-short dashed line).

In Step 70, a time derivative of the steering angle $\theta$ or the corrected steering angle $\theta$ is calculated as the steering angular velocity $\theta d$, and a map represented by the solid line of FIG. 6 is referred to based on the steering angular velocity $\theta d$, thereby calculating the target steering attenuation torque Td corresponding to the target steering attenuation force. As shown in FIG. 6 and FIG. 7, when the magnitude of the steering angular velocity $\theta d$ is less than a reference value $\theta dc$ (positive constant), the magnitude of the target steering attenuation torque Td when the driving support control is being carried out is less than the magnitude of the target steering attenuation torque Td when the driving support control is not being carried out. Conversely, when the magnitude of the steering angular velocity $\theta d$ is more than the reference value $\theta dc$, the magnitude of the target steering attenuation torque Td when the driving support control is being carried out is more than the magnitude of the target steering attenuation torque Td when the driving support control is not being carried out.

Further, when the magnitude of the steering angular velocity $\theta d$ is the reference value $\theta dc$, the magnitude of the target steering attenuation torque Td when the driving support control is being carried out is the same as the magnitude of the target steering attenuation torque Td when the driving support control is not being carried out. Thus, a difference $\Delta Td$ in the target steering attenuation torque, which is a value acquired by subtracting the latter target steering attenuation torque Td from the former target steering attenuation torque Td, is 0. $\Delta \theta dc$ is set to a positive constant of ½ to ⅓ of $\theta dc$. A range of the steering angular velocity between $\theta dc - \Delta \theta dc$ and $\theta dc + \Delta \theta dc$ is set to a predetermined range of the steering angular velocity. When the magnitude of the steering angular velocity $\theta d$ is a value in the predetermined range of the steering angular velocity, the magnitude of the difference $\Delta Td$ in the target steering attenuation torque gradually increases as the difference between the magnitude of the steering angular velocity $\theta d$ used in calculating the target steering attenuation torque Td and the reference value $\theta dc$ increases.

Figure 9:
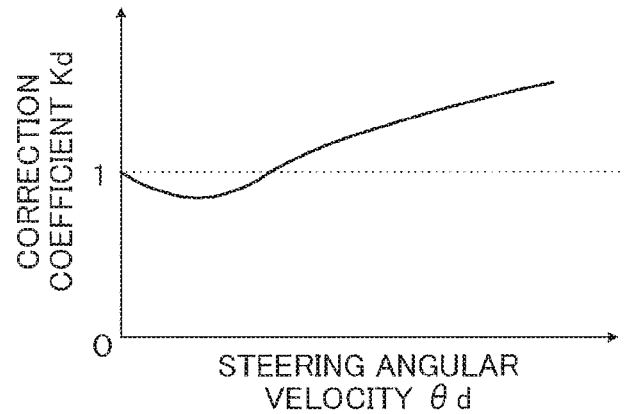
FIG. 9 is a graph for showing a relationship between the steering angular velocity θd and a correction coefficient Kd according to a second modified example of the present disclosure.

The target steering attenuation torque Td when the driving support control is being carried out may be calculated in the following manner (second modified example). First, the target steering attenuation torque Td is temporarily calculated by referring to the map represented by the broken line of FIG. 6 based on the steering angular velocity θd. Then, a correction coefficient Kd is calculated by referring to a map shown in FIG. 9 based on the steering angular velocity θd. Further, the target steering attenuation torque Td when the driving support control is being carried out is calculated as a product of the target steering attenuation torque Td temporarily calculated and the correction coefficient Kd.

When Step 40 or Step 70 is completed, the steering reaction force torque control proceeds to Step 80. In Step 80, a sum Tp+Td of the target steering spring torque Tp and the target steering attenuation torque Td is calculated as a target steering reaction force torque Tat.

In Step 90, a command current Iepst directed to the electric power steering device 12 for causing the steering torque T to reach the target steering reaction force torque Tat through PID feedback control is calculated based on a deviation between the steering torque T and the target steering reaction force torque Tat.

In Step 100, the command current Iepst is supplied to the motor 36 of the electric power steering device 12, thereby controlling the electric power steering device 12 so that the steering reaction force Ta reaches the target steering reaction force torque Tat.

<Driving Support Control>

Next, a description is given of a routine of controlling driving support in the embodiment with reference to the flowchart illustrated in FIG. 3.

First, in Step 210, a signal indicating image information on the front field of view of the vehicle that is photographed with the CCD camera 60, and a signal indicating the position of the selection switch 62 are read.

In Step 220, it is determined whether or not the selection switch 62 is on, that is, whether or not LKA control is being carried out. When a negative determination is made, the driving support control proceeds to Step 250, whereas when an affirmative determination is made, the driving support control proceeds to Step 230.

In Step 230, a traveling lane that is ahead of the vehicle 18 is identified based on the information on the front field of view of the vehicle that is photographed with the CCD camera 60 and the like. In Step 240, the target steering angle θt under LKA control, namely, the target steering angle θt for allowing the vehicle 18 to travel along the traveling lane is calculated. The identification of the traveling lane and the calculation of the target steering angle θt do not constitute the present disclosure, and thus an arbitrary technique widely known in the technical field may be employed to carry out those processes like, for example, the one described in Japanese Patent No. 5737197.

In Step 250, the target steering angle θt under LKA control is set to 0. When Step 240 or Step 250 is finished, the driving support control proceeds to Step 260.

In Step 260, a signal indicating the target steering angle θt is output from the driving support control device 16 to the EPS control device 14.

As can be understood from the description given above, when the selection switch 62 is in the operation position (on), the EPS control device 14 and the driving support control device 16 respectively operate as described above. Specifically, by the driving support control device 16 carrying out the driving support control in accordance with the flowchart illustrated in FIG. 3, the target steering angle θt for the front wheels 20FL and 20FR for allowing the vehicle 18 to travel along a predetermined traveling lane is calculated. By the EPS control device 14 controlling the steering reaction force torque in accordance with the flowchart illustrated in FIG. 2, the steering reaction force felt by the driver is controlled and the steered angle of the front wheels 20FL and 20FR is controlled to reach the steered angle corresponding to the target steering angle θt.

In particular, as illustrated in FIG. 2, the target steering reaction force torque Tat varies depending on whether or not the driving support control is being carried out, that is, whether or not the driving support control device 16 is operating.

<Not Under Driving Support Control>

In Step 20 of FIG. 2, the negative determination is made, in Step 30, the target steering spring torque Tp is calculated based on the steering angle θ, and in Step 40, the target steering attenuation torque Td is calculated based on the steering angular velocity θd. In Step 80, the sum Tp+Td of the target steering spring torque Tp and the target steering attenuation torque Td is calculated as the target steering reaction force torque Tat. Further, in Step 90 and Step 100, the electric power steering device 12 is controlled through the PID feedback control so that the steering torque T reaches the target steering reaction force torque Tat.

<Under Driving Support Control>

In Step 20 of FIG. 2, the positive determination is made, and in Step 50, the corrected steering angle θ is calculated by subtracting the target steering angle θt from the steering angle G. In Step 60, the target steering spring torque Tp is calculated based on the corrected steering angle θ, and in Step 70, the target steering attenuation torque Td is calculated based on the steering angular velocity θd, which is the time derivative of the steering angle θ or the corrected steering angle θ. In Step 80, the target steering reaction force torque Tat is calculated similarly to the case in which the driving support control is not being carried out. Further, in Step 90 and Step 100, the electric power steering device 12 is controlled through the PID feedback control so that the steering torque T reaches the target steering reaction force torque Tat.

In any one of the case in which the driving support control is being carried out and the case in which the driving support control is not being carried out, the steering spring torque and the steering attenuation torque are controlled to reach the target steering spring torque Tp and the target steering attenuation torque Td, respectively. Thus, the steering spring torque and the steering attenuation torque, which are included in the steering reaction force torque, can be controlled in response to the steering operation of the driver.

When the driving support control is being carried out, the target steering spring torque Tp is calculated based on the corrected steering angle θ calculated by subtracting the target steering angle θt from the steering angle θ. Thus, the target steering spring torque Tp acts as a target torque for causing the steering spring torque to reach the target steering spring torque, and causing the steering angle θ to approach the target steering angle θt. Thus, the steered angle of the front wheels 20FL and 20FR can be controlled to reach a steered angle for causing the vehicle 18 to travel along the traveling lane.

In particular, when the magnitude of the corrected steering angle θ is less than the reference value θpc, the target steering spring torque Tp is calculated so that the magnitude of the target steering spring torque Tp becomes larger in the case in which the driving support device is operating and the driving support control is being carried out compared with the case in which the driving support control is not being carried out. Thus, even when the driving support control is being carried out, the magnitude of the torque for causing the steering angle θ to approach the target steering angle θt can be increased compared with the case in which the magnitude of the target steering spring torque Tp is not increased. Thus, a property of the front wheels 20FL and 20FR to follow the target steered angle can be improved in the case in which the driving support control is being carried out.

Conversely, when the magnitude of the corrected steering angle θ is more than the reference value θpc, the magnitude of the target steering spring torque Tp is calculated so that the magnitude of the target steering spring torque Tp becomes smaller in the case in which the driving support device is operating and the driving support control is being carried out compared with the case in which the driving support control is not being carried out. Thus, the magnitude of the torque for causing the actual steered angle of the front wheels 20FL and 20FR to approach the target steered angle is reduced. Thus, in a case in which the driver performs steering at an operation amount that is large in magnitude toward the direction of causing the actual steered angle of the front wheels 20FL and 20FR to depart from the target steered angle, such a fear that the steering spring torque interferes with the steering operation of the driver can be reduced, thereby improving the operability of the override steering.

The difference ΔTp in the target steering spring torque, namely, the difference between the target steering spring torque Tp in the case in which the driving support control is being carried out and the target steering spring torque Tp in the case in which the driving support control is not being carried out, is 0 when the magnitude of the corrected steering angle θ is the reference value θpc. Further, the difference ΔTp in the target steering spring torque gradually increases as the magnitude of the difference between the magnitude of the corrected steering angle θ and the reference value θpc increases in the predetermined range of the steering angle between θpc−Δθpc and θpc+Δθpc. Thus, as the magnitude of the difference between the magnitude of the corrected steering angle θ and the reference value θpc increases in the predetermined range of the steering angle with respect to the reference value, the difference ΔTp gradually increases from 0. Thus, when the magnitude of the corrected steering angle θ increases/decreases beyond the reference value θpc, the magnitude of the difference ΔTp in the target steering spring torque is prevented from drastically changing.

Referring to FIG. 5, compared with the embodiment, a description is now given of a first comparative example and a second comparative example in which, when the driving support control is being carried out, the target steering spring torque Tp is corrected to increase/decrease from a value when the driving support control is not being carried out.

In FIG. 5, the target steering spring torque Tp of the first comparative example is represented by a long dashed short dashed line. In the first comparative example, when the magnitude of the corrected steering angle θ is less than the reference value θpc, the target steering spring torque Tp is corrected to increase by multiplying the target steering spring torque Tp by a first correction coefficient, which is a constant more than 1. Further, when the magnitude of the corrected steering angle θ is more than the reference value θpc, the target steering spring torque Tp is corrected to decrease by multiplying the target steering spring torque Tp by a second correction coefficient, which is a positive constant less than 1.

In FIG. 5, the target steering spring torque Tp of the second comparative example is represented by a long dashed double-short dashed line. In the second comparative example, when the magnitude of the corrected steering angle θ is less than the reference value θpc, the target steering spring torque Tp is corrected to increase by adding a first correction amount (positive constant) to the target steering spring torque Tp. Further, when the magnitude of the corrected steering angle θ is more than the reference value θpc, the target steering spring torque Tp is corrected to decrease by subtracting a second correction amount (positive constant) from the target steering spring torque Tp.

As shown in FIG. 5, also in the first and second comparative examples, when the magnitude of the corrected steering angle θ is less than the reference value θpc, the magnitude of the target steering spring torque Tp can be increased in the case in which the driving support control is being carried out compared with the case in which the driving support control is not being carried out. Conversely, when the magnitude of the corrected steering angle θ is more than the reference value θpc, the magnitude of the target steering spring torque Tp can be decreased in the case in which the driving support control is being carried out compared with the case in which the driving support control is not being carried out.

However, in any one of the first and second comparative examples, the respective correction coefficients and correction amounts are the constants. Thus, as represented by the long dashed short dashed line and the long dashed and double-short dashed line in FIG. 5, when the magnitude of the corrected steering angle θ increases/decreases beyond the reference value θpc, the magnitude of the target steering spring torque Tp cannot be prevented from drastically changing.

In contrast, in the embodiment, as represented by the solid line in FIG. 5, even when the magnitude of the corrected steering angle θ increases/decreases beyond the reference value θpc, the magnitude of the target steering spring torque Tp can be effectively prevented from drastically changing.

When the magnitude of the steering angular velocity θd that is a time derivative of the steering angle θ or the corrected steering angle θ is less than a reference value θdc, the target steering attenuation torque Td when the driving support control is being carried out is calculated to be less in magnitude than that when the driving support control is not being carried out. Consequently, as compared to where the target steering attenuation torque Td when the driving support control is being carried out is not made smaller in magnitude, a resistive torque that opposes the steering angle θ from following the target steering angle θt can be reduced. Thus, a property of the front wheels 20FL and 20FR to follow the target steered angle can be improved in the case in which the driving support control is being carried out.

Conversely, when the magnitude of the steering angular velocity θd is more than a reference value θdc, the target steering attenuation torque Td when the driving support control is being carried out is calculated to be more in magnitude than that when the driving support control is not being carried out. Consequently, a resistive torque that opposes the actual steered angle of the front wheels 20FL and 20FR from being changed can be increased. Thus, in a case in which the driver performs steering at an operation amount that is large in magnitude to change the actual steered angle of the front wheels 20FL and 20FR, the steering attenuation torque can be increased in magnitude, thereby improving the operability of the override steering.

The difference ΔTd in the target steering attenuation torque, namely, the difference between the target steering attenuation torque Td in the case in which the driving support control is being carried out and the target steering attenuation torque Td in the case in which the driving support control is not being carried out, is 0 when the magnitude of the steering angular velocity θd is the reference value θdc. Further, the difference ΔTd in the target steering attenuation torque gradually increases as the magnitude of the difference between the magnitude of the steering angular velocity θd and the reference value θdc increases in the predetermined range of the steering angular velocity between θdc−Δθdc and θdc+Δθdc. Thus, as the magnitude of the difference between the magnitude of the steering angular velocity θd and the reference value θdc increases in the predetermined range of the steering angular velocity with respect to the reference value, the difference ΔTd gradually increases from 0. Thus, when the magnitude of the steering angular velocity θd increases/decreases beyond the reference value θdc, the magnitude of the difference ΔTd in the target steering attenuation torque is prevented from drastically changing.

Referring now to FIG. 7, comparing with the embodiment, the first and second comparative examples will be explained in which in the case in which the driving support control is being carried out, the target steering attenuation torque Td is corrected to increase or decrease from that in the case in which the driving support control is not being carried out.

In FIG. 7, the target steering attenuation torque Td in the first comparative example is illustrated in a long dashed short dashed line. In the first comparative example, when the magnitude of the steering angular velocity θd is less than a reference value θdc, the target steering attenuation torque Td is corrected to decrease by multiplying the target steering attenuation torque Td by a first correction coefficient that is a positive constant less than 1. In addition, when the magnitude of the steering angular velocity θd is more than the reference value θdc, the target steering attenuation torque Td is corrected to increase by multiplying the target steering attenuation torque Td by a second correction coefficient that is a positive constant more than 1.

In FIG. 7, the target steering attenuation torque Td in the second comparative example is illustrated in a long dashed double-short dashed line. In the second comparative example, when the magnitude of the steering angular velocity θd is less than a reference value θdc, the target steering attenuation torque Td is corrected to decrease by subtracting a first correction amount (a positive constant) from the target steering attenuation torque Td. In addition, when the magnitude of the steering angular velocity θd is more than the reference value θdc, the target steering attenuation torque Td is corrected to increase by adding a second correction amount (a positive constant) to the target steering attenuation torque Td.

As illustrated in FIG. 7, also in the first and second comparative examples, when the magnitude of the steering angular velocity θd is less than the reference value θdc, the magnitude of the target steering attenuation torque Td can be decreased in the case in which the driving support control is being carried out compared with the case in which the driving support control is not being carried out. Conversely, when the magnitude of the steering attenuation torque Td is more than the reference value θdc, the magnitude of the target steering attenuation torque Td can be increased in the case in which the driving support control is being carried out compared with the case in which the driving support control is not being carried out.

In the second comparative example, however, the correction coefficients and the correction amounts, respectively, are constants. Consequently, as represented by a long dashed short dashed line and a long dashed double-short dashed line in FIG. 7, when the magnitude of the steering angular velocity θd increases/decreases beyond the reference value θdc, the magnitude of the target steering attenuation torque Td cannot be prevented from drastically changing.

In contrast, in the embodiment, as represented by the solid line in FIG. 7, even when the magnitude of the steering angular velocity θd increases/decreases beyond the reference value θdc, the magnitude of the target steering attenuation torque Td can be effectively prevented from drastically changing.

The specific embodiment of the present disclosure is described in detail above. However, the present disclosure is not limited to the above-mentioned embodiments. It is apparent for those skilled in the art that various other embodiments may be employed within the scope of the present disclosure.

For example, in the embodiment, as shown in FIGS. 4 and 5, when the magnitude of the steering angle θ is more than the reference value θpc, the magnitude of the target steering spring torque Tp when the driving support control is being carried out is less than the magnitude of the target steering spring torque Tp when the driving support control is not being carried out. However, the magnitude of the target steering spring torque Tp when the driving support control is being carried out may be the same as the magnitude of the target steering spring torque Tp when the driving support control is not being carried out.

Similarly, in the embodiment, as shown in FIGS. 6 and 7, when the magnitude of the steering angular velocity θd is more than the reference value θdc, the magnitude of the target steering attenuation torque Td when the driving support control is being carried out is more than the magnitude of the target steering attenuation torque Td when the driving support control is not being carried out. However, the magnitude of the target steering attenuation torque Td when the driving support control is being carried out may be the same as the magnitude of the target steering attenuation torque Td when the driving support control is not being carried out.

Figure 10:
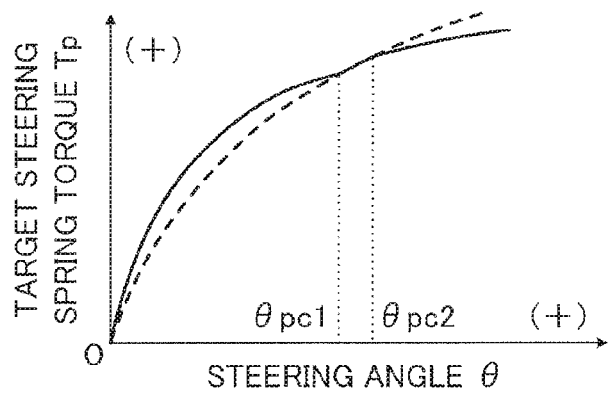
FIG. 10 is a graph for showing a modified example of the relationship shown in FIG. 4 in an enlarged form in the range in which the steering angle θ is positive and small.

Moreover, in the embodiment, the difference ΔTp between the target steering spring torque Tp when the driving support control is being carried out and the target steering spring torque Tp when the driving support control is not being carried out is 0 when the magnitude of the corrected steering angle θ is the reference value θpc. However, as shown in FIG. 10, the difference ΔTp in the target steering spring torque may be corrected to be 0 when the magnitude of the corrected steering angle θ is in a range between a first reference value θpc1 (positive constant) and a second reference value θpc2 (positive constant larger than θpc1).

Figure 11:
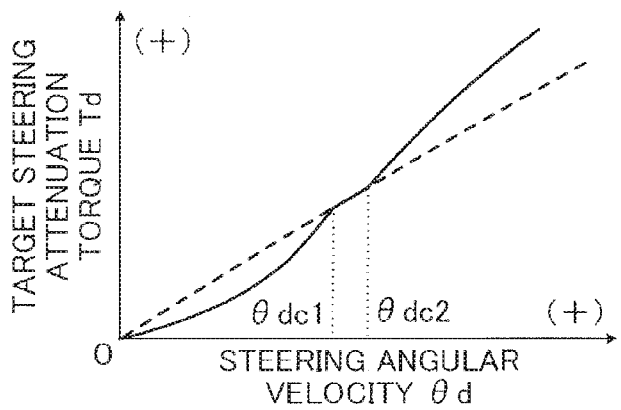
FIG. 11 is a graph for showing a modified example of the relationship shown in FIG. 6 in an enlarged form in the range in which the steering angular velocity θd is positive and small.

Similarly, in the embodiment, the difference ΔTd between the target steering attenuation torque Td when the driving support control is being carried out and the target steering attenuation torque Td when the driving support control is not being carried out is 0 when the magnitude of the steering angular velocity θd is the reference value θdc. However, as shown in FIG. 11, the difference ΔTd in the target steering attenuation torque may be corrected to be 0 when the magnitude of the steering angular velocity θd is in a range between a third reference value θdc1 (positive constant) and a fourth reference value θdc2 (positive constant larger than θdc1).

Moreover, in the embodiment, the relationship between the steering angle θ and the target steering spring torque Tp and the relationship between the steering angular velocity θd and the target steering attenuation torque Td are constant regardless of the travel state of the vehicle 18, e.g., the vehicle speed V. However, at least one of the relationships may be variably set depending on the travel state of the vehicle 18. Moreover, the reference values θpc and θdc are constant, but at least one of the reference values θpc and θdc may be variably set depending on the travel state of the vehicle 18, e.g., the vehicle speed V.

Moreover, in the embodiment, the target steering reaction force torque corresponding to the target steering reaction force includes the target steering spring torque Tp corresponding to the target steering spring force and the target steering attenuation torque Td corresponding to the target steering attenuation force. However, the target steering reaction force torque may not include the target steering attenuation torque Td corresponding to the target steering attenuation force, or conversely, may include, in addition to the target steering spring torque Tp and the target steering attenuation torque Td, a target steering friction torque corresponding to a target steering friction force.

Further, in the embodiment, a steering transmission ratio variable device, which is configured to rotate a steering shaft on the pinion-shaft 34 side relative to a steering shaft on the steering wheel 22 side, is not provided in the steering apparatus. However, the steering reaction force control apparatus of the present disclosure may be applied to a vehicle in which the steering transmission ratio variable device is provided in the steering apparatus. In that case, the driving support control device 16 may calculate a target angle θpt of the pinion shaft 34 as a target value of the driving support control. Further, the target steering angle θt may be calculated as θpt−Δθr where Δθr denotes a relative rotational angle of the steering shaft on the pinion shaft 34 side with respect to the steering shaft on the steering wheel 22 side, which is produced by the steering transmission ratio variable device.

Further, in the embodiment, the "steering indication value" is the steering angle θ, but may be any one of a rotational angle of the motor of the electric power steering device, the steered angle of the steered wheel, a yaw rate of the vehicle, a lateral acceleration of the vehicle, and a rotational angle of a pinion shaft or a stroke of a rack bar when the steering device is a rack-and-pinion device.

What is claimed is:

1. A steering reaction force control apparatus for a vehicle, which is to be applied to a vehicle having an electric power steering device and a driving support device configured to control the electric power steering device so that a steered angle of steered wheels reaches a target steered angle, the steering reaction force control apparatus comprising:
a controller configured to control the electric power steering device and the driving support device; and
the controller being configured to:
acquire a steering indication value representing an actual steering operation amount of a driver;
calculate a target steering reaction force including a target steering spring force that is based on the steering indication value; and
control the electric power steering device so that a steering reaction force reaches the target steering reaction force; and
calculate the target steering spring force based on the steering indication value when the driving support device is not operating and calculate the target steering spring force based on a corrected steering indication value acquired by correcting the steering indication value with a target steering indication value corresponding to the target steered angle when the driving support device is operating; wherein
when a magnitude of the steering indication value for calculating the target steering spring force is less than a reference value, the controller is configured to calculate the target steering spring force so that a magnitude of the target steering spring force becomes larger when the driving support device is operating compared with when the driving support device is not operating wherein, when the magnitude of the steering indication value for calculating the target steering spring force is more than the reference value, the controller is configured to calculate the target steering spring force so that the magnitude of the target steering spring force becomes smaller when the driving support device is operating compared with when the driving support device is not operating.

2. The steering reaction force control apparatus for a vehicle according to claim 1, wherein a difference between the target steering spring force when the driving support device is operating and the target steering spring force when the driving support device is not operating is 0 when the magnitude of the steering indication value for calculating the target steering spring force is the reference value, and gradually increases as a magnitude of a difference between the magnitude of the steering indication value for calculating the target steering spring force and the reference value increases in a range equal to or less than a predetermined value.

* * * * *